(12) United States Patent
Smith et al.

(10) Patent No.: US 6,526,181 B1
(45) Date of Patent: Feb. 25, 2003

(54) APPARATUS AND METHOD FOR ELIMINATING IMAGING SENSOR LINE NOISE

(75) Inventors: Craig M. Smith, Spencerport, NY (US); Toshiki Miyano, Yokohama (JP); Kyoichi Omata, Tanashi (JP)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/146,015

(22) Filed: Sep. 2, 1998

(30) Foreign Application Priority Data

Jan. 27, 1998 (JP) .......................................... 10-014143

(51) Int. Cl.[7] .......................... G06T 5/00; H04N 1/409; H04N 1/58; H04N 5/217; H04N 9/083
(52) U.S. Cl. ........................ 382/275; 348/276; 348/241; 358/513; 358/463
(58) Field of Search .......................... 382/275; 348/276, 348/241, 272, 273, 280, 282, 283, 266, 254, 255, 256; 358/513, 530, 463

(56) References Cited

U.S. PATENT DOCUMENTS 5,280,347 A * 1/1994 Shiraishi et al. ............ 348/273

FOREIGN PATENT DOCUMENTS

EP 729 278 A2 * 8/1996 ............ H04N/9/04

OTHER PUBLICATIONS

Glozbach, J. W. et al, "Method of Color Filter Array Interpolation with Alias Cancellation Properties", IEEE Signal Processing Society, Proceedings of the 2001 Int'l Conference on Image Processing, Oct. 7–10, 2001, vol. 1 of 3, p. 141–144.*

* cited by examiner

Primary Examiner—Scott Rogers
(74) Attorney, Agent, or Firm—Pamela R. Crocker

(57) ABSTRACT

A noise elimination apparatus and method enable effective elimination of noise on each line in an image captured by a CCD provided with a Bayer-type color filter. A graduation device obtains the quantity of graduation for a target picture element by obtaining the difference between the mean value of the value of the target pixel and the value of a pixel around the target pixel and the value of the target pixel. A high frequency component detector detects the high frequency component of the target pixel using Laplacian filter based upon the target pixel and each of the pixels immediately adjacent to said target pixel are input. A high frequency component can be detected without being influenced by noise on each line by using a filter based upon each of the pixels immediately adjacent to said target pixel. Noise on each line can be effectively eliminated by adding the optimum quantity of graduation based upon the absolute value of the high frequency component detected by the high frequency component detector to the value of the target pixel.

10 Claims, 3 Drawing Sheets

| G | R | G | R | G | R |
|---|---|---|---|---|---|
| B | G | B | G | B | G |
| G | R | G | R | G | R |
| B | G | B | G | B | G |
| G | R | G | R | G | R |
| B | G | B | G | B | G |

FILTER COEFFICIENT

| 1/8 | 0 | 1/8 |
|---|---|---|
| 0 | 1/2 | 0 |
| 1/8 | 0 | 1/8 |

Fig. 5

LOW-PASS FILTER COEFFICIENT

| 1/8 | 0 | 1/8 |
|---|---|---|
| 0 | -1/2 | 0 |
| 1/8 | 0 | 1/8 |

Fig. 6

GRADUATION QUANTITY DECISION FILTER

| -1/8 | 0 | -1/8 |
|---|---|---|
| 0 | 1/2 | 0 |
| -1/8 | 0 | -1/8 |

Fig. 7

APPARATUS AND METHOD FOR ELIMINATING IMAGING SENSOR LINE NOISE

FIELD OF THE INVENTION

The present invention relates to an imaging apparatus such as electronic or digital still cameras and digital video cameras. Particularly, the present invention relates to an apparatus and a method for eliminating the noise of image data output by a photoelectric transducer element in an imaging apparatus of such an apparatus.

BACKGROUND OF THE INVENTION

In digital still or video cameras, an optical image must be converted to an electronic image. A photoelectric transducer element such as a charge coupled device (CCD) is commonly used for such conversion.

In such a digital device, it is common for image data to be composed of separate color components such as red (R), green (G), blue (B), CMY, etc. A number of digital cameras use separate CCDs for each color, such as a CCD for red (R), a CCD for blue (B) and a CCD for green (G).

However, in order to reduce manufacturing costs and simplify equipment, many devices instead acquire image data for three primary colors of R, G and B using a single CCD. To acquire image data of the three primary colors using the one CCD, a method of attaching a mosaic optical filter to the single CCD is widely utilized. Such a filter is called a color filter array (CFA) and, when such a filter is attached to a CCD, data for each color is detected in a separate pixel. For example, data for red (R) may be detected in one pixel, and data for green (G) may be detected in the adjoining pixel.

The colors in a color filter may be arrayed in a variety of patterns with a Bayer color array being a common example of a typical array. FIG. 1 shows how colors are arranged in a Bayer array color filter.

As shown in FIG. 1, there are twice as many pixels of G as R or B in the Bayer array. This is because the G information is more important for human vision.

In an image processing unit for acquiring image data using a CCD, the mismatch of gain in an even line and in an odd line may occur.

This type of mismatch is especially significant in devices where two output terminals are provided for an even line and one output terminal is provided to an odd line of a CCD. The mismatch becomes remarkable because, when two output terminals are provided, a separate output is provided for respective output terminals and differences between amplifier gains may be reflected in their respective output signals. That is, a difference between amplifier gains of the amplifiers appear as a difference in magnitude between output signals.

Such mismatches may also occur in CCDs provided with only one output terminal. Generally, when the data of a pixel is output, the value of a pixel being output is often influenced by the value of the previously output pixel because of the amplification characteristics of the amplifier provided to the one output terminal and a mismatch may result.

In this case, a mismatch may occur because, if the data of a pixel is influenced by that of the previous pixel as described above, the value of a green (G) pixel in an odd line is influenced by the value of the adjacent red (R) pixel because of the characteristics of a Bayer array. Similarly, the value of a green (G) pixel in an even line is influenced by the value of the adjacent blue (B) pixel. Therefore, if, for example, a red object is photographed, green in an odd line will be strongly influenced by the adjacent red pixel, however, green in an even line will be little influenced by the adjacent pixel. As a result, the values for green pixels in the odd and even lines will differ and, as a result, a mismatch will occur.

A method for adjusting an amplifier and an attenuator for adjusting a difference between gains in odd and even lines in cameras with a CCD with two output terminals, as well as a method of storing a calibration value and correcting gains in an odd line and in an even line in image processing are known or proposed.

However, the factors leading to a CCD gain mismatch are often variable and inconstant; for example, the effect of the previous pixel in the same line varies greatly with temperature. It is therefore in practice very difficult to execute any of the above described methods and their application remains, for the most part, theoretical.

Noise caused by the mismatch of gains in odd and even lines commonly causes lateral stripes in a final image. Further, interpolation, edge highlighting processing, or other processes applied to the image containing these lateral stripes may compound the negative effects. The quality of a final image may be severely deteriorated.

As such differences between gains in odd and even lines may be regarded as striped noise, the elimination of the striped noise by noise elimination processing in the final step of image processing may be also taken into consideration. However, there is then a problem that a considerable amount of time is required for image processing and a further problem that the edge of an image may blur because of the side effects of noise elimination.

SUMMARY OF THE INVENTION

The present invention is made to solve the problems outlined above and has an object of providing a noise elimination method and apparatus which can eliminate noise caused by the mismatch of odd and even line gains from image data acquired from a CCD provided with a color filter. The present invention is characterized in that, in order to solve the above problems, components as described below are included in a noise elimination apparatus in order to eliminate the noise of Bayer-type image data output by a photoelectric transducer element provided with Bayer-type color filter.

That is, the present invention is characterized in that the noise elimination apparatus includes high frequency component quantity detecting means for detecting the value of a high frequency component in each pixel of the Bayer-type image data, graduation quantity calculating means for calculating the quantity of graduation in each pixel of the above Bayer-type image data, and optimum graduation quantity determining means for changing the above quantity of graduation to an optimum value based upon the value of a high frequency component detected by the high frequency component quantity detecting means and then adding the changed quantity of graduation to each pixel.

By adding an optimum quantity of graduation based upon the value of a high frequency component of each pixel, the deterioration of image quality can be reduced.

The present invention may also be characterized in that the above high frequency component quantity detecting means may include a Laplacian filter to which the value of a target pixel and the values of the four pixels immediately adjacent to the target pixel are input. A signal output from the above Laplacian filter is output as the value of a high frequency component. The input of these pixel values enables the reduction of the effect of noise on each line.

The high frequency component quantity detecting means of the present invention may also comprise a Laplacian filter to which the value of a target pixel and of the four immediately adjacent pixels are input, upper and lower difference calculating means for outputting the absolute value of difference between the values of the upper and lower adjacent pixels to the target pixel, right and left difference calculating means for outputting the absolute value of difference between the values of the pixels to the right and left of the target pixel, and addition means for weighting and adding a signal output from the above Laplacian filter, a signal output from the above upper and lower difference calculating means and a signal output from the above right and left difference calculating means. A signal output from the above addition means is output as the value of a high frequency component. This configuration reduces the effect of noise on each line and thereby reduces, or eliminates, the resulting deterioration of image quality.

The graduation quantity calculating means of the present invention may include mean value calculating means for acquiring the weighted mean value of the value of a target pixel and the values of pixels around the target pixel and differential value calculating means for outputting a differential value between the above weighted mean value and the value of the target pixel. A signal output from the above differential value calculating means is output as the quantity of graduation.

As difference is output as the quantity of graduation, the quantity of graduation according to the quality of an image can be calculated.

Another aspect of the present invention relates to a noise elimination apparatus characterized in that optimum graduation quantity determining means as described above further includes conversion means for converting the value of a high frequency component to a scale factor, multiplication means for multiplying the scale factor and the quantity of graduation, and addition means for adding the quantity of graduation multiplied by the scale factor to the value of a target pixel. As a scale factor varies according to the value of a high frequency component, noise can be eliminated while image quality is maintained.

A still further aspect of the present invention is in the form of a noise elimination method for eliminating the noise in Bayer-type image data output by a photoelectric transducer element provided with Bayer-type color filter. In such a method, the value of a high frequency component in each pixel of Bayer-type image data is found, a graduation quantity calculation step calculates the quantity of the graduation of each pixel constituting Bayer-type image data, and an optimum graduation quantity determination step changes the quantity of graduation to an optimum quantity based upon the high frequency component value detected in the high frequency component quantity detection step and adding the changed quantity of graduation to the value of each pixel are included.

As the quantity of graduation added is based upon the value of a high frequency component of a pixel, the deterioration of the quality of an image can be reduced.

Yet another aspect of the present invention is characterized in that the high frequency component quantity detection step includes a Laplacian filtering step for calculating the quadratic differential value of the value of the following target pixel based upon the value of a target pixel and the values of each of the four immediately adjacent pixels. The quadratic differential value is calculated as the value of a high frequency component.

As the values of all adjacent pixels are input, the effect of noise on each line can be reduced.

The present invention may also be configured so as to comprise a high frequency component quantity detection step including a Laplacian filtering step for inputting the value of a target pixel and the values of the four immediately adjacent pixels and calculating the quadratic differential value of the value of the target pixel, an upper and lower difference calculation step for calculating the absolute value of difference between the values of the pixels immediately above and below the target pixel, a right and left difference calculation step for calculating the absolute value of difference between the values of the pixels to the immediate right and left of the target pixel, and an addition step for weighting and adding the quadratic differential value, a signal output in the upper and lower difference calculation step, and a signal output in the right and left difference calculation step. A signal output in the addition step is output as the value of a high frequency component.

With such a configuration the deterioration of image quality is reduced because the difference between pixel values is referred to in order to reduce the effect of noise on each line.

The present invention may also be comprised so that the graduation quantity calculation step includes a mean value calculation step for acquiring the weighted mean value of the value of a target pixel and the values of surrounding pixels and a differential value calculation step for calculating a differential value between the weighted mean value and the value of the target pixel. A signal output from the differential value calculation step is used to calculate the quantity of graduation. As difference is output as the quantity of graduation, the quantity of graduation according to image quality can be calculated.

The present invention further relates to a noise elimination method characterized in that the optimum graduation quantity determination step includes a conversion step for converting the value of a high frequency component to a scale factor, a multiplication step for multiplying the scale factor and the quantity of graduation, and an addition step for adding the quantity of graduation multiplied by the scale factor to the value of a target pixel.

As a scale factor varies according to the value of a high frequency component, noise can be eliminated while maintaining image quality.

BRIEF DESCRIPTION OF THE DRAWINGS

FIG. 4 is an explanatory drawing showing relationship among pixels adopted by the high frequency component detecting means;

FIG. 5 is an explanatory drawing showing the coefficient of a low-pass filter adopted as a means for acquiring the quantity of graduation;

FIG. 6 is an explanatory drawing showing the coefficient of a graduation quantity decision filter used for acquiring the quantity of graduation;

FIG. 7 is an explanatory drawing showing the coefficient of a high-pass filter.

DETAILED DESCRIPTION OF THE INVENTION

A preferred embodiment of the present invention will be described below while referring to the attached drawings.

As described above, in a Bayer array green (G) pixels exist on both odd and even lines. As red (R) and blue (B) pixels are present only on respective odd or even lines, they are unlikely to be influenced by line noise and this embodiment of the present invention therefore is directed towards a method of filtering according to whether or not a green (G) pixel contains a high frequency component of an image. Noise on each line particular to a green pixel can be eliminated by suitable means.

Figures 1, 2, 3:
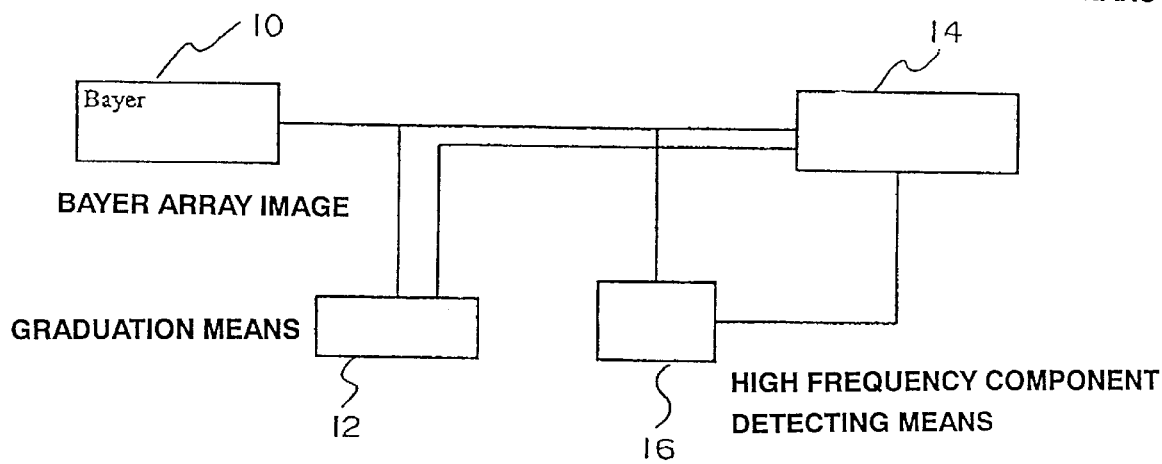
FIG. 1 is an explanatory drawing showing the arrangement of R, G, and B in a Bayer array color filter.
FIG. 2 is a block diagram showing a noise elimination apparatus of the present invention.
FIG. 3 is an explanatory drawing showing the coefficient of Laplacian filter used by high frequency component detecting means of the present invention.

FIG. 2 is a functional block diagram showing a noise elimination apparatus according to this embodiment of the present invention. As shown in FIG. 2, Bayer array image 10 contains image data acquired from a CCD provided with an optical filter, such as shown in FIG. 1 and other figures, and each pixel is provided with only the information of a single chromatic component in the arrangement of colors as shown in the optical filter of FIG. 1.

Graduation means 12 generates graduation data for eliminating noise from the input Bayer array image 10. The constitution of the graduation means 12 will be described in detail below. Graduation adapting means 14 blur the Bayer array image 10 according to the quantity of graduation. These graduation adapting means 14 eliminate image noise.

High frequency component detecting means 16 detect a high frequency component in a pixel for judging whether or not that pixel of an input Bayer array image 10 contains the high frequency component of an image. The constitution of the high frequency component detecting means 16 will also be described in detail below.

The graduation adapting means 14 does not add the raw quantity of graduation acquired by the graduation means 12 to the Bayer array image 10, but rather adds an optimum quantity of graduation calculated based upon the value of a high frequency component of a pixel acquired by the high frequency component detecting means 16.

More specifically, noise on each line can be effectively eliminated without deteriorating the quality of an image because the graduation means 12 adds a smaller value than the quantity of graduation to a pixel containing a high frequency component of an image and adds a larger value than the quantity of graduation to a flat portion of the image not containing a high frequency component.

Each component constituting this embodiment of the present invention will be described in greater detail below.

(1) High frequency component detecting means (1—1) Laplacian filter

As described above, in the device according to the present embodiment, any high frequency component in a pixel is detected by the high frequency component detecting means 16 in order to eliminate noise in that pixel. The high frequency component detecting means 16 in this embodiment of the present invention uses a Laplacian filter based upon a target green pixel and the four pixels immediately adjacent to that green pixel.

FIG. 3 is an explanatory drawing showing the coefficient of the Laplacian filter used by the high frequency component detecting means 16. As shown in FIG. 3, the Laplacian filter is provided with a (5,5) matrix with the target pixel in the center. As shown in FIG. 3, the coefficient of the target pixel is '1', while the coefficients of the other four pixels are all '−1/4'.

The absolute value of the convolution of the Laplacian filter provided with such filter coefficients and the value of the image data of the Bayer array image 10 is utilized as a scale for the value of a high frequency component in the target green pixel in this embodiment of the present invention.

In this embodiment of the present invention all pixels are referenced in the Laplacian filter used by the high frequency component detecting means 16. Therefore, if a target pixel is located on an even line, the value of a high frequency component can be calculated based on only pixels on even lines. Conversely, if a target green pixel exists on an odd line, the high frequency component is estimated based on only odd line pixels. In this manner, the value of the pixel's high frequency can be found without introducing the above-described line noise effects.

The value output by the Laplacian filter as described above is referred to as result 1 in this embodiment of the present invention.

(1-2) Utilization of a differential value between the values of pixels

As it is desirable to eliminate all noise from a green pixel, not only the output value of the above Laplacian filter, but the following values are utilized to detect a high frequency component.

For example, it is also desirable that a weighted added value based upon difference between the values of the right and left red or blue pixels of a target green pixel, difference between the values of the upper and lower blue or red pixels and the output value of the Laplacian filter based upon the target pixel and each of the four other pixels on the upper, lower, right, and left sides of the target pixel be used. The four pixels adjacent to the target green pixel are labeled as R1, R2, B1, and B2 in the example shown by FIG. 4.

As shown in FIG. 4, in a Bayer array, either the blue pixels (B1 and B2) are on the upper and lower sides of a target green pixel and the red pixels (R1 and R2) are on the right and left sides, or the red pixels (R1 and R2) are on the upper and lower sides and the blue pixels (B1 and B2) are on the right and left, according to the target green pixel is located on an even line or on an odd line. However, for either case as described above, the value for the high frequency component can be found using the following expression:

High frequency quantity=Coeff1\*abs($B1-B2$)+Coeff2\*abs($R1-R2$)+Coeff3\*abs(Result1)     [Equation 1]

In the above expression, 'abs' denotes an operation for acquiring an absolute value; "Coeff1", "Coeff2", and "Coeff3" respectively denote weighting factors; and "Result 1" denotes the output value of the Laplacian filter as described above. The output value of the Laplacian filter is acquired from a filter factor shown in FIG. 3 and the value of image data. Each coefficient is an optimum value acquired based on the characteristics of the imaging apparatus and CCD and the sensitivity of each color.

(2) Graduation means

The graduation means 12 shown in FIG. 2 obtains the quantity of graduation when noise in a green pixel is eliminated. Specifically, in the present embodiment, the graduation means obtains the difference between the weighted mean value of a target pixel and pixels around the target pixel and the value of the target pixel.

More specifically, the weighted mean value of a target green pixel and diagonal four pixels on the upper, lower, right and left sides of the target pixel is obtained by the convolution of a low-pass filter and a Bayer array image 10. FIG. 5 is an explanatory drawing for explaining the filter factors of the low-pass filter used in this embodiment of the present invention. As shown in FIG. 5, the coefficient of a target green pixel is '1/2', and the coefficients of the four diagonally adjacent pixels are all '1/8'. The weighted mean value of the target pixel and the four diagonally adjacent pixels is acquired using the low-pass filter provided with such filter factors as the output value of the low-pass filter. In the present embodiment, the difference between the mean value and value of the target green pixel is obtained and this difference is used as the quantity of graduation. That is, the quantity of graduation is a value calculated by the following expression:

$$\text{Graduation quantity} = -(G-(\text{convoluted value of low-pass filter and Bayer array image})) \quad [\text{Equation 2}]$$

As shown by the above expression, the mean value is obtained using the low-pass filter, and the quantity of graduation is obtained by subtracting the value of the target green pixel from the mean value. However, the operation is finally equivalent to an operation for convoluting the following graduation quantity decision filter and the value of the Bayer array image 10. FIG. 6 is an explanatory drawing showing the factors of the graduation quantity decision filter in this embodiment of the present invention. As shown in FIG. 6, the factors of the graduation quantity decision filter are equal to the factors of the low-pass filter except that the coefficient of the target pixel is '−1/2'.

The graduation quantity decision filter shown in FIG. 6 is equivalent to a high-pass filter with an inverted sign. FIG. 7 shows an example of factors of the high-pass filter, which correspond to the factors of the low-pass filter shown in FIG. 4. Therefore, in this embodiment, graduation quantity=−1× (high frequency component). A high frequency component refers to a value acquired by the convolution of the high-pass filter provided with factors shown in FIG. 7 and the value of each pixel in a Bayer array image.

The quantity of graduation can then be obtained by the following expression:

$$\text{Graduation quantity} = \text{graduation quantity decision filter} * \text{Bayer array image ('*' denotes convolution.)} \quad [\text{Equation 3}]$$

(3) Graduation adapting means

Next, the operation of the graduation adapting means 14 shown in FIG. 2 will be described. The graduation adapting means 14 determines the quantity of graduation using the absolute value of the output value (the value of a high frequency component) of the high frequency component detecting means 16 described in (1-1) or (1-2) above as a scale factor. That is, a value acquired by multiplying the quantity of graduation calculated and acquired above by the scale factor is utilized as the final quantity of graduation. In this description, the scale factor is called an adapted graduation quantity coefficient. The adapted graduation quantity coefficient is calculated in the following expression:

Adapted graduation quantity coefficient=scale table(abs (high frequency component quantity))

Figure 8:
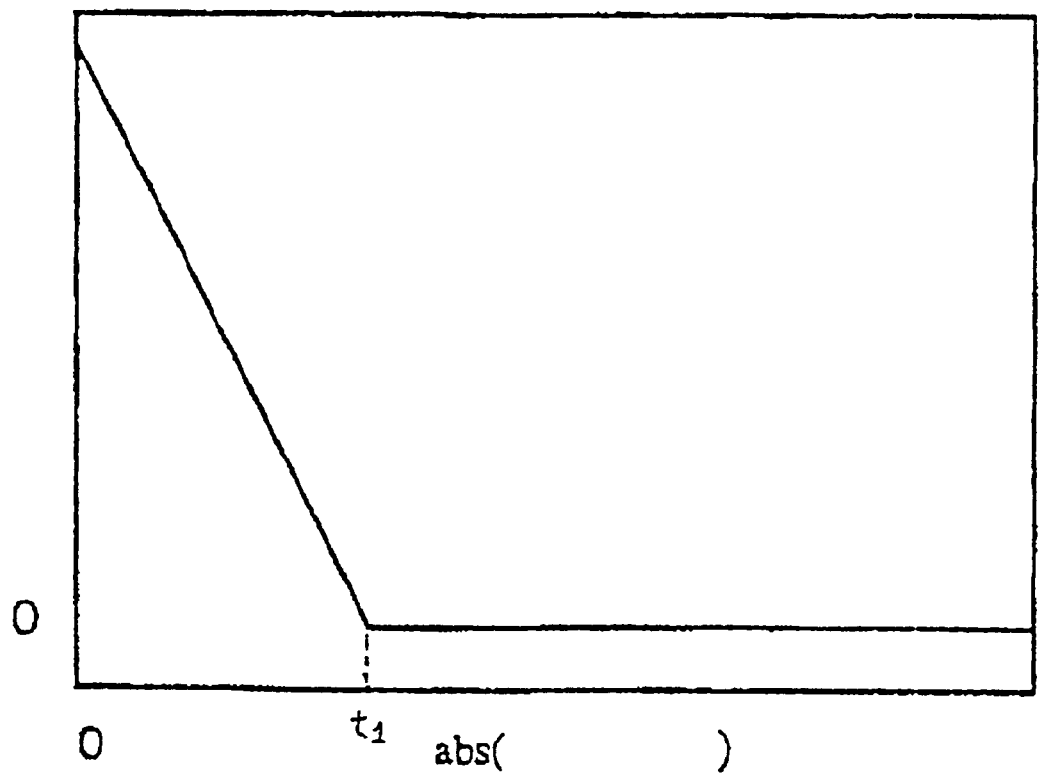
FIG. 8 is a graph showing a relationship between input and output in a scale table for outputting a scale factor adopted by the graduation adapting means.

The above scale table is a look-up table for obtaining the coefficient of optimum graduation quantity when the absolute value of the value of a high frequency component is input. Qualitatively, when the absolute value of the value of a high frequency component is small, a large value is output by the scale table and when the absolute value of the value of a high frequency component is large, the scale table outputs a zero. FIG. 8 shows sample scale table contents.

The graph shown in FIG. 8 shows the relationship between scale table input and output. The x-axis of the graph shows the absolute value of an input high frequency component. The y-axis of the graph shows the coefficient of adapted graduation quantity output from the scale table. As shown in the graph, when the absolute value of the high frequency component value is small, the coefficient of adapted graduation quantity is large. Particularly, the coefficient of the adapted graduation quantity reaches its maximum value when the absolute value of the value of a high frequency component is zero. If the absolute value of the value of a high frequency component increases and exceeds a threshold value t1, the coefficient of adapted graduation quantity becomes zero because it is desirable that the quantity of graduation be set to zero to maintain the image quality when the absolute value of the value of a high frequency component is large.

The graduation adapting means 14 calculates a scale factor to be multiplied by the quantity of graduation based upon the absolute value of the value of a high frequency component output from the high frequency component detecting means 16. The scale factor is referred to as an adapted graduation quantity coefficient. The graduation adapting means 14 also multiplies the quantity of graduation output from the graduation means 12 by the adapted graduation quantity coefficient and adds the result of the multiplication to the output of green G. As a result, the graduation adapting means 14 calculates the final output G' of green using the following expression:

$$G'=G+\text{adapted graduation quantity coefficient} * \text{graduation quantity} = G+\text{scale table(abs(high frequency component quantity))} * \text{graduation quantity} \quad [\text{Equation 4}]$$

As described above, in this embodiment of the present invention, the adapted quantity of graduation is added so that noise on each line of a Bayer array image can be effectively eliminated. As a result, line noise effecting each green pixel can be eliminated and, as this result is achieved without the cause of noise on each line, and the method of the present invention is effective even when the line noise is caused by a plurality of sources.

In this embodiment of the present invention, a filter is made to act for the most part only on portions effected by line noise, that is, the low frequency part of an image, so as to effectuate graduation. In high frequency components, such as edges, no filter acts and image quality is maintained unchanged. As a result, noise can be effectively eliminated without blurring dulling image edges.

Further, according to this embodiment of the present invention, noise can be eliminated prior to performing another image processing such as, for example, interpolation, color correction, or edge highlighting. Therefore, noise related effect on other image processing can be effectively removed.

Furthermore, in this embodiment of the present invention, as image information filtering is not executed in the conventional manner in which the cause of noise is regulated on every line, random sensor and circuit noise can be effectively eliminated along with line noise.

As described above, according to the present invention, as the quantity of graduation is determined based upon the value for a high frequency component, a noise elimination apparatus and method in which the noise of an image can be reduced without deteriorating image quality at edges or elsewhere are obtained.

Also, according to the present invention, the value of a high frequency component is obtained by a Laplacian filter using the value of a target pixel and the values of four adjacent pixels. This enables the resulting apparatus and method to effectively eliminate noise on each line.

Also, according to the present invention, as the value of a high frequency component is calculated based upon differences among the values of the upper, lower, right, and left pixels of a target pixel in addition to an output signal of the above Laplacian filter, the resulting apparatus and method can obtain a more precise value for a high frequency component.

Still further, according to the present invention, as difference between the weighted mean value of the value of a target pixel and the values of pixels around the target pixel and the value of the target pixel is used for the quantity of graduation, an apparatus and a method which respectively enable keeping the value of the target pixel an average value and effectively preventing noise can be obtained.

And, according to the present invention, as the value of a high frequency component is converted to a predetermined scale factor and after the scale factor is multiplied by the quantity of graduation, the quantity of the graduation is added to the value of a target pixel. Therefore, an apparatus and a method which can adapt graduation to the high frequency component value can be obtained.

What is claimed is:

1. A noise elimination apparatus for eliminating noise from image data output by a photoelectric transducer element provided with a Bayer-type color filter, comprising:

high frequency component value detecting means for detecting the value of a high frequency component of each pixel constituting the image data;

graduation quantity calculating means for calculating the quantity of graduation of each pixel constituting the image data; and optimum graduation quantity determining means for suitably changing said quantity of graduation based upon the high frequency component value detected by said high frequency component quantity detecting means and adding the changed quantity of graduation to the value of each pixel.

2. A noise elimination apparatus according to claim 1, wherein:

said high frequency component value detecting means comprises a Laplacian filter to which the value of a target pixel and the values of each of the pixels immediately adjacent to said target pixel are input; and said high frequency component quantity detecting means outputs a signal output from said Laplacian filter as said value of a high frequency component.

3. A noise elimination apparatus according to claim 1, wherein:

said high frequency component value detecting means comprises:
   a Laplacian filter to which the value of a target pixel and the values of each of the pixels immediately adjacent to said target pixel are input;
   upper and lower difference calculating means for outputting the absolute value of the difference between the values of pixels on the upper and lower sides of said target pixel;
   right and left difference calculating means for outputting the absolute value of the difference between the values of pixels on the right and left sides of said target pixel; and
   addition means for weighting and adding a signal output from said Laplacian filter, a signal output from said upper and lower difference calculating means, and a signal output from said right and left difference calculating means;
   wherein
   a signal output from said addition means is output as the value of a high frequency component.

4. A noise elimination apparatus according to claim 1, wherein:

said graduation quantity calculating means comprises:
   mean value calculating means for obtaining the weighted mean value of the value of a target pixel and the value of a pixel around said target pixel; and
   differential value calculating means for outputting the differential value between said weighted mean value and the value of said target pixel; and
   a signal output from said differential value calculating means is output as said quantity of graduation.

5. A noise elimination apparatus according to claim 1, wherein:

said optimum graduation quantity determining means comprises:
   conversion means for converting said high frequency component value to a scale factor;
   multiplication means for multiplying said quantity of graduation by said scale factor; and
   addition means for adding said quantity of graduation multiplied by said scale factor to the value of said target pixel.

6. A noise elimination method for eliminating noise from image data output by a photoelectric transducer element provided with a Bayer-type color filter, comprising:

a high frequency component quantity detection step for detecting the high frequency component value of each pixel constituting Bayer-type image data;
   a graduation quantity calculation step for calculating the quantity of graduation of each pixel constituting said Bayer-type image data; and
   an optimum graduation quantity determination step for suitably changing said quantity of graduation based upon the value of a high frequency component detected in said high frequency component quantity detection step and adding the changed quantity of graduation to the value of said each pixel.

7. A noise elimination method according to claim 6, wherein:

said high frequency component quantity detection step comprises a Laplacian filtering step for calculating the respective quadratic differential values of the value of a target pixel and the values of each of the pixels immediately adjacent to said target pixel; and
   said calculated quadratic differential values are used as said high frequency component value.

8. A noise elimination method according to claim 6, wherein:

said high frequency component quantity detection step comprises:
   a Laplacian filtering step for inputting the value of a target pixel and the values of each of the pixels immediately adjacent to said target pixel and calculating the respective quadratic differential values of the values of said pixels;
   an upper and lower difference calculation step for calculating the absolute value of difference between the values of the upper and lower pixels of said target pixel;

a right and left difference calculation step for calculating the absolute value of difference between the values of the right and left pixels of said target pixel; and an addition step for weighting and adding said quadratic differential values, a signal output in said upper and lower difference calculation step, and a signal output in said right and left difference calculation step; wherein a signal output found in said addition step is used as said high frequency component value.

9. A noise elimination method according to claim 6, wherein:

said graduation quantity calculation step comprises:
a mean value calculation step for obtaining the weighted mean value of the value of a target pixel and the value of a pixel adjacent to said target pixel; and a differential value calculation step for calculating a differential value between said weighted mean value and the value of said target pixel; wherein a signal output found in said differential value calculation step is used as said quantity of graduation.

10. A noise elimination method according to claim 6, wherein:

said optimum graduation quantity determination step comprises:
a conversion step for converting said value of a high frequency component to a scale factor;
a multiplication step for multiplying said quantity of graduation by said scale factor; and
an addition step for adding said quantity of graduation multiplied by said scale factor to the value of said target pixel.

* * * * *